United States Patent [19]

Staver

[11] 4,155,420
[45] May 22, 1979

[54] THEFT PROOF IGNITION SYSTEM

[76] Inventor: Clifford Staver, 293 Corey St., West Roxbury, Mass. 02132

[21] Appl. No.: 796,142

[22] Filed: May 12, 1977

[51] Int. Cl.² .............................................. B60R 25/04
[52] U.S. Cl. ..................................... 180/114; 70/236;
  70/255; 123/198 B; 200/19 L; 200/45;
  200/61.64; 307/10 AT
[58] Field of Search ........ 180/114; 200/19 L, 19 DC,
  200/19 DR, 43, 45, 61.64, 61.67; 70/255, 236;
  307/10 AT; 123/198 B

[56] References Cited

U.S. PATENT DOCUMENTS

| | | | |
|---|---|---|---|
| 1,438,388 | 12/1922 | Mayer | 200/19 L |
| 2,021,166 | 11/1935 | Bickel | 200/19 L |
| 2,133,799 | 10/1938 | Bickel | 200/19 DR |
| 2,439,155 | 4/1948 | Wilkes | 200/45 X |
| 3,010,531 | 11/1961 | Flora | 180/114 |
| 3,343,625 | 9/1967 | Scheuermann | 180/114 |
| 3,669,211 | 6/1972 | Gilgoff | 180/114 X |
| 3,773,138 | 11/1973 | Killmeyer | 180/114 |
| 3,820,361 | 6/1974 | Leitner | 200/61.67 X |
| 3,902,075 | 8/1975 | Oros | 307/10 AT |

FOREIGN PATENT DOCUMENTS 400104  8/1924 Fed. Rep. of Germany ............. 70/255
312017 12/1955 Switzerland.

Primary Examiner—John P. Silverstrim
Attorney, Agent, or Firm—Wolf, Greenfield & Sacks

[57] ABSTRACT

A device for preventing the theft of a motor vehicle employs a casing that encloses the vehicle's distributor in a virtually impenetrable shell. A stack of rotatable discs in the casing must be properly set in the manner of a combination lock to enable the high voltage electrical signals from the distributor to fire the spark plugs of the engine. The discs in the casing are set by dials within the passenger compartment of the vehicle. The discs have contacts on their surfaces which align when the discs are properly set to provide electrical paths from the distributor to electrical connectors outside the casing. The high voltage electrical ignition harness wires for the spark plugs are attached to those outside connectors. A cover is secured to the casing in a manner that enables the casing to be opened only when the discs are aligned in a pre-established relation, which can be different from the relation that enables the engine to be started.

1 Claim, 6 Drawing Figures

THEFT PROOF IGNITION SYSTEM

FIELD OF THE INVENTION

The invention relates in general to apparatus for preventing theft or unauthorized use of a car or truck. More particularly, the invention pertains to apparatus that is attached to the conventional distributor system in a manner which makes it extremely difficult to defeat the apparatus.

BACKGROUND OF THE INVENTION

The high cost of automobiles and their high mobility make them prime targets for theft. Most prior anti-theft devices involve the locking of a mechanism critical to the operation of the automobile, such as the ignition system, the steering wheel, the drive shaft, the transmission, etc. Most of those prior systems have the disadvantage of being easily by-passed or defeated, For example, ignition locking systems that do not protect the distributor can be electrically by-passed or "jumped". Nearly all devices which operate by locking a mechanical part may be defeated by "picking" or breaking the lock.

Only a few of the previously proposed anti-theft arrangements have the distributor within the locking system. For example the arrangements described in U.S. Pat. No. 2,136,673 and No. 3,773,138 include protection of the distributor. Such arrangements have an advantage over previous systems in that one can by-pass them only by a rather sophisticated method of substituting a new distributor (along with ignition system adjuncts), which requires time consuming and difficult mechanical modifications and adjustments. The arrangements of the cited patents however, are not without disadvantages, as an analysis of those arrangements will show.

The arrangement described in U.S. Pat. No. 3,773,138 is a locked enclosure attached to the vehicle fire wall within the passenger compartment which contains all the ignition elements including the distributor. That arrangement requires a lengthy driving rod to connect the distributor with a driving means on the engine. That arrangement has the disadvantage that it is difficult to connect the driving rod to the driving means in the standard automobile because the usual placement of the driving means requires that the driving rod exit from the top of the engine; thus in order for the driving rod to enter the passenger compartment one or more right angle turns in the driving rod is necessary. Furthermore the device can be by-passed by the above mentioned substitutional method.

The anti-theft arrangement described in U.S. Pat. No. 2,136,673 employs a means for engaging and disengaging the distributor drive rod through a lockable shaft and lever system. That system has the disadvantage of being easily defeated by breaking the locks, cutting through the sheeting around the flexible shaft, or if a person were familiar with the locking device, by drilling through the casing and disengaging or breaking a single spring within it which releases the lever switch, re-engaging the distributor drive shaft.

OBJECTS OF THE INVENTION

The principal object of the invention is to provide a vehicle theft-prevention device which can readily be attached to conventional automobile engines and cannot be easily defeated by breaking or drilling, or by-passed by sophisticated thieves employing substitution ignition systems.

SUMMARY OF THE INVENTION

The invention resides in theft preventing apparatus for vehicles of the type having a distributor that controls the firing of the cylinders in the engine by providing high voltage electrical signals to the spark plugs. In accordance with the invention the distributor and its high voltage terminals are encased in a virtually impenetrable shell. The casing can be made of hardened steel to resist penetration and can be capped by a cover of the same material. There are electrical connectors external to the casing for providing electrical connections to the high voltage terminals of the distributor. The invention employs rotatable discs in the casing to establish one or more electrical paths from the high voltage distributor terminals to one or more of the external electrical connectors when the discs are in a pre-determined relation. Inside the casing are provisions enabling the casing to be locked about the distributor in a manner preventing the removal of the distributor from the engine. There are no external locks or levers that can be broken or by-passed to defeat the invention. Since the distributor is enclosed by the casing, the distributor shaft is not exposed and cannot be used to by-pass the arrangement. The casing cannot be removed except by very great force which necessarily must also severely damage or destroy the distributor mount and/or drive which would make the engine inoperable.

BRIEF DESCRIPTION OF THE DRAWING

The invention, both as to its construction and mode of operation, can be better understood from the detailed description which follows when it is considered in conjunction with the accompanying drawings in which.

DESCRIPTION OF THE PREFERRED EMBODIMENT

Figure 1:
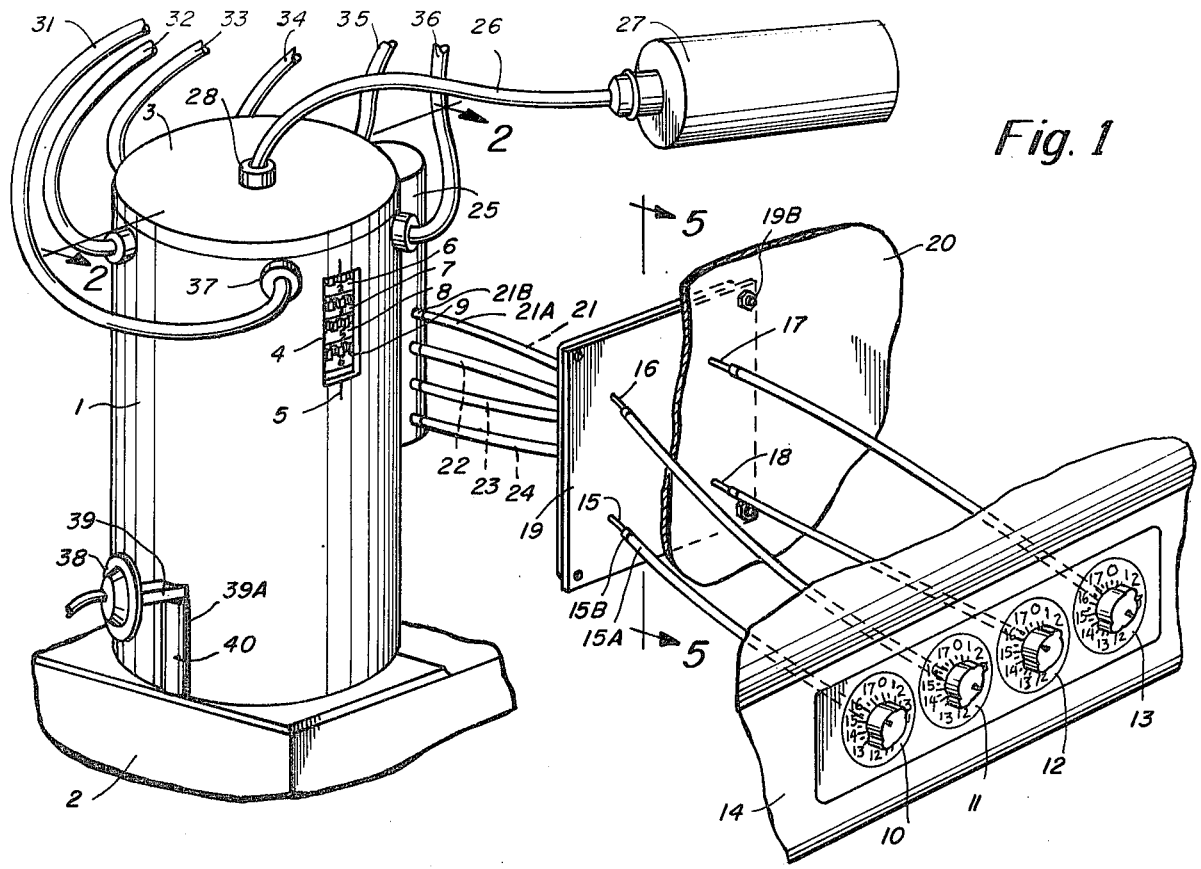
FIG. 1 is a pictorial representation of the invention showing at the left the portion of the invention which attaches to the distributor, in the middle showing the portion which attaches to the fire wall of the vehicle, and at the right showing the portion within the passenger compartment of the vehicle.

FIG. 1 depicts the preferred embodiment of the invention and shows a casing 1 disposed over an engine block 2 and enclosing the engine's distributor. The casing includes a hollow cylinder and a cover 3. Preferably, the cylinder and cover are made of a material such as hardened steel which can be penetrated only with great difficulty. The casing is provided with a window 4 having index lines 5 for aligning numbers on rotatable discs 6, 7, 8, and 9. The window can be closed by a transparent pane on which the index line can be inscribed. Preferably, the pane is of an unbreakable material and arranged to prevent its removal from the window from outside the casing. To enable the discs 6, 7, 8, and 9 to be turned from the passenger compartment of the vehicle, dials 10, 11, 12, and 13 are provided on the dashboard 14. The dials can be turned to set them to any number on the dial faces. Each of the dials controls the setting of a different one of the discs 6, 7, 8, and 9 in the casing through flexible shafts 15, 16, 17, and 18 and a gearing arrangement having gears mounted on a plate 19 attached to the firewall 20 in the engine compartment. Gears on plate 19 are connected by flexible shafts 21, 22, 23, and 24 to gears in a housing 25 that is secured to the casing 1. Each of shafts 15 through 18 and 21 through 24 are covered by a protective sheath such as 15A and 21A. At each end of each sheath is a small circular collar, such as collar 15B on sheath 15A and collar 21B on sheath 21A, which collar serves to securely fix the end of the sheath to the wall (for example collar 21B securely fixes sheath 21A to the wall of gear housing 25).

The high voltage lead 26 from ignition coil 27 is inserted through an insulative grommet 28 into the casing and extends into contact with a terminal of the enclosed distributor. The high voltage for the spark plugs of the engine are conveyed to the plugs by ignition harness wires 31, 32, 33, 34, 35, and 36 which are connected to electrical terminals at the top of the casing through insulative grommets 37.

To enable the spark advance mechanism 38 of the ignition system to be connected through the casing to the distributor, an aperture 39A is provided in the casing which permits the rod 39 of that mechanism to extend to the distributor. A plate 40 is provided to restrict the opening to the space needed to enable the rod to enter the casing.

Figure 2:
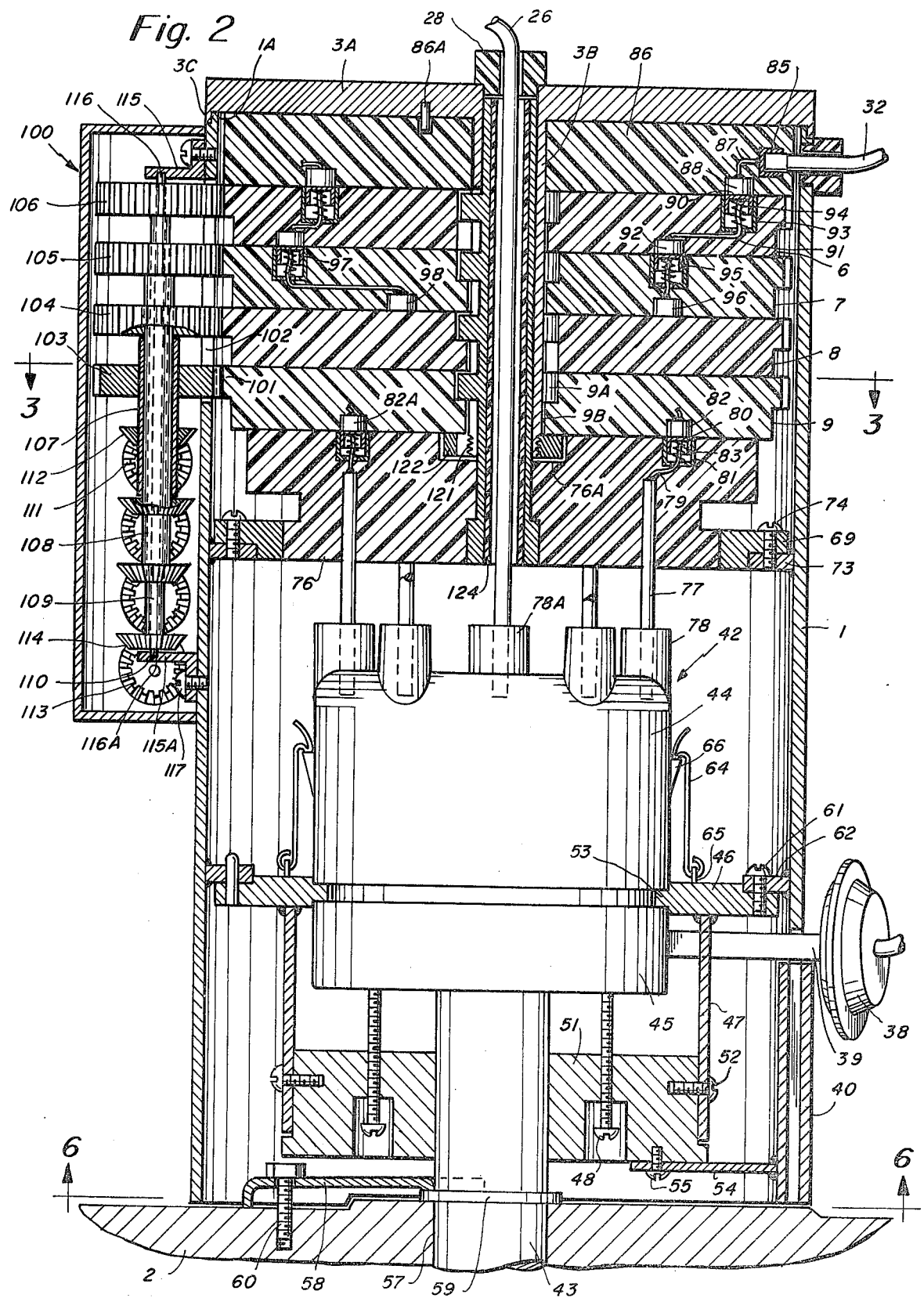
FIG. 2 is a cross-section of the invention taken through lines 2—2 of FIG. 1.
Figure 6:
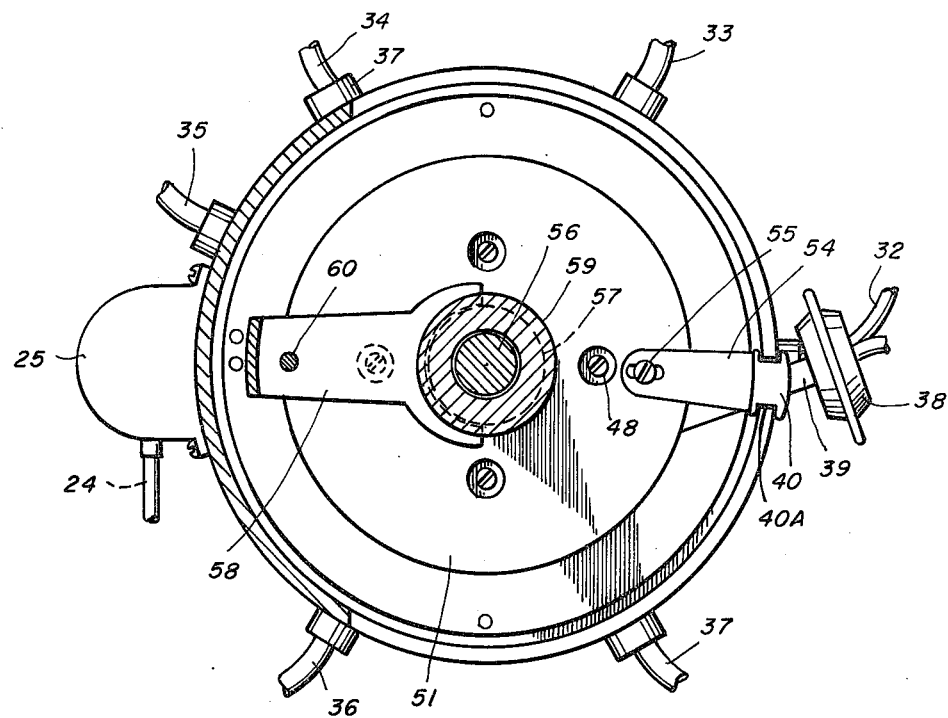
FIG. 6 is a cross-section of the invention taken through lines 6—6 of FIG. 2.

Turning now to FIG. 2, distributor 42 is shown within the protective casing 1. To install the protective casing, the distributor is removed from the engine by turning the bolt 60 to loosen the hold-down clamp 58. With clamp 58 out of the way, the distributor together with its shaft 43 are lifted to separate them from the engine. With distributor 42 and its shaft 43 removed from the engine block 2 and distributor cover 44 removed from distributor base 45, circular flange 46 is attached to base 45. The circular flange is secured to a collar 47 carrying a circular plug 51 in which bolts 48 are threaded. As bolts 48 are turned, they push against base 45 and force plug 51 away from the base. As collar 47 is pulled downward, tongue 53 of flange 46 seats on the upper edge of base 45. Base 45 is thus firmly clamped between screws 48 and tongue 53. The grooved plate 40 which is welded to arm 54 is then fastened to plug 51 by screw 55. The assembly is mounted on engine block 2 by inserting the distributor drive shaft 43 into engine block opening 57 and tightening bolt 60 to force clamp 58 against the collar 59 of shaft 43. Casing 1 is slid down about flange 46 so that aperture 39A fits over distributor vacuum advance rod 39 and the edges of aperture 39A slip snugly into grooves 40A in plate 40 (best seen in FIG. 6). Screws 61 are then tightened to firmly secure circular casing flange 62 to the frame flange 46.

Distributor cap 44 is secured in place on tongue 53 by the conventional distributor retaining clips 64 which grasp eyelets 65 anchored in flange 46 and clip over lips 66.

Figure 4:
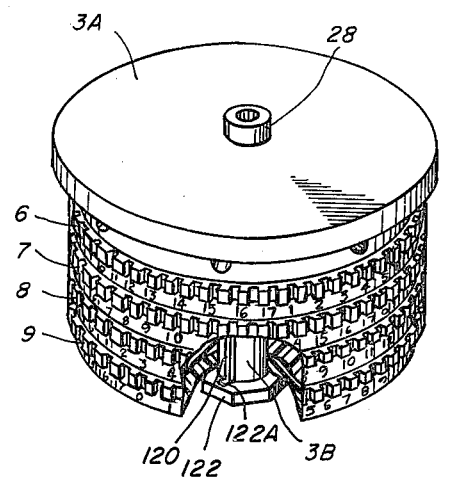
FIG. 4 is a semi-exploded view showing the preferred embodiment of the mechanism for locking the casing cover in place.
Figure 4:
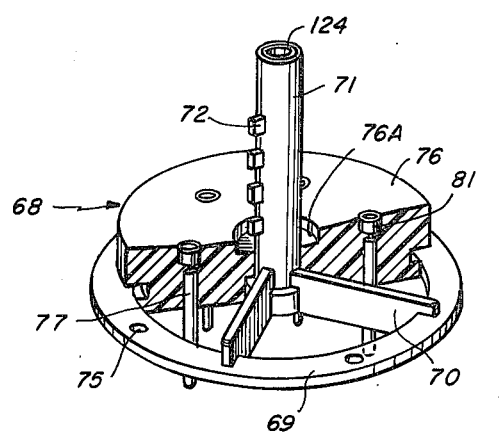

Locking member 68, shown in perspective in FIG. 4, employs a circular base 69 having radially extending braces 70 which support a central cylindrical post 71. On cylindrical post 71 are integral studs 72 which protrude from the post. The locking member is secured to the upper flange 73 of the casing (FIG. 2) by bolts 74 which extend through holes 75 in base 69 and engage threaded holes in the upper flange. The locking member carries on insulating plastic plug 76 from which conductors 77 extend downwardly, as shown in FIG. 2, into the high voltage terminals 78 in distributor cap 44. On its upper surface, the insulating plug has spring loaded contacts 80 which ride in conducting seats 81 embedded in the plug. Each of the contacts 80 is electrically connected to a different one of the conductors 77. The springs 83 of those contacts force them outwardly from their seats and against the surface of adjacent disc 9.

The movable discs 6 through 9 shown in FIG. 2 carry the means for completing electrical paths within casing 1 from the distributor's high voltage terminals 78 to terminals 85 embedded in an upper insulating plug 86. The spark plug wires engage the electrical terminals 85 to carry the high voltage signals to the spark plugs as indicated in FIG. 2 by the spark plug wire 32 having its end seated in terminal 85. Wire leads 87 make electrical connections between terminals 85 and contacts 88 in the lower surface of insulating plug 86. In the illustrated embodiment there are six such contacts 88, one for each of the six terminals, although only two appear in FIG. 2. Each of the discs 6 through 9 is an electrical insulator carrying six spring loaded contacts, such as the contact 90, in the upper surface of the disc. Each of those contacts is connected by a lead 91 within the disc to a different one of six contacts 92 in the lower surface of the disc. Each contact 90 rises in a conductive seat 93 embedded in the surface of the disc 6, with spring 94 forcing it against contact 88 in plug 86 or against the surface of plug 86 when disc 6 is not aligned so that the contacts coincide. Similarly each of the other discs 7, 8, and 9 have six pairs of contacts with typical ones being shown at 95 and 96 and 97 and 98. In FIG. 2, disc 8 is turned so that no contacts are visible in this cross-section and disc 9 is turned so that only two lower contacts 82 and 82A are visible.

Discs 6, 7, 8 and 9 are stacked within casing 1 with the surface of one disc abutting the facing surface of the contiguous disc so that the contacts on the facing surfaces can be brought into mating alignment to establish a continuous electrical path from each electrical connector 32 to the appropriate high voltage terminal 78 of the distributor. The probability is infinitesmally small that the arrangement of the discs which results from randomly rotating the discs will result in electrical connections between the connectors 32 and their appropriate distributor terminals. The distribution of the contacts on the surfaces of the discs is preferably so arranged that only one of the great multitude of possible arrangements results in an electrical path being completed between each of the connectors 31 through 36 and its appropriate high voltage distributor terminal. When that chosen arrangement occurs, a unique combination of numbers is aligned with index 5 in window 4 (FIG. 1). When the discs are arranged in that combination, the engine can be started. However if just one of the discs is moved by a little more than the width of a contact from its position in which the car may be started, the electrical paths will be broken and it will not be possible to keep the engine in operation.

As mentioned above in the discussion of FIG. 1, each of discs 6 through 9 may be rotated in order to align (and disalign) the contacts by operating a dial within the passenger compartment of the vehicle. Gear system 100

Figure 3:
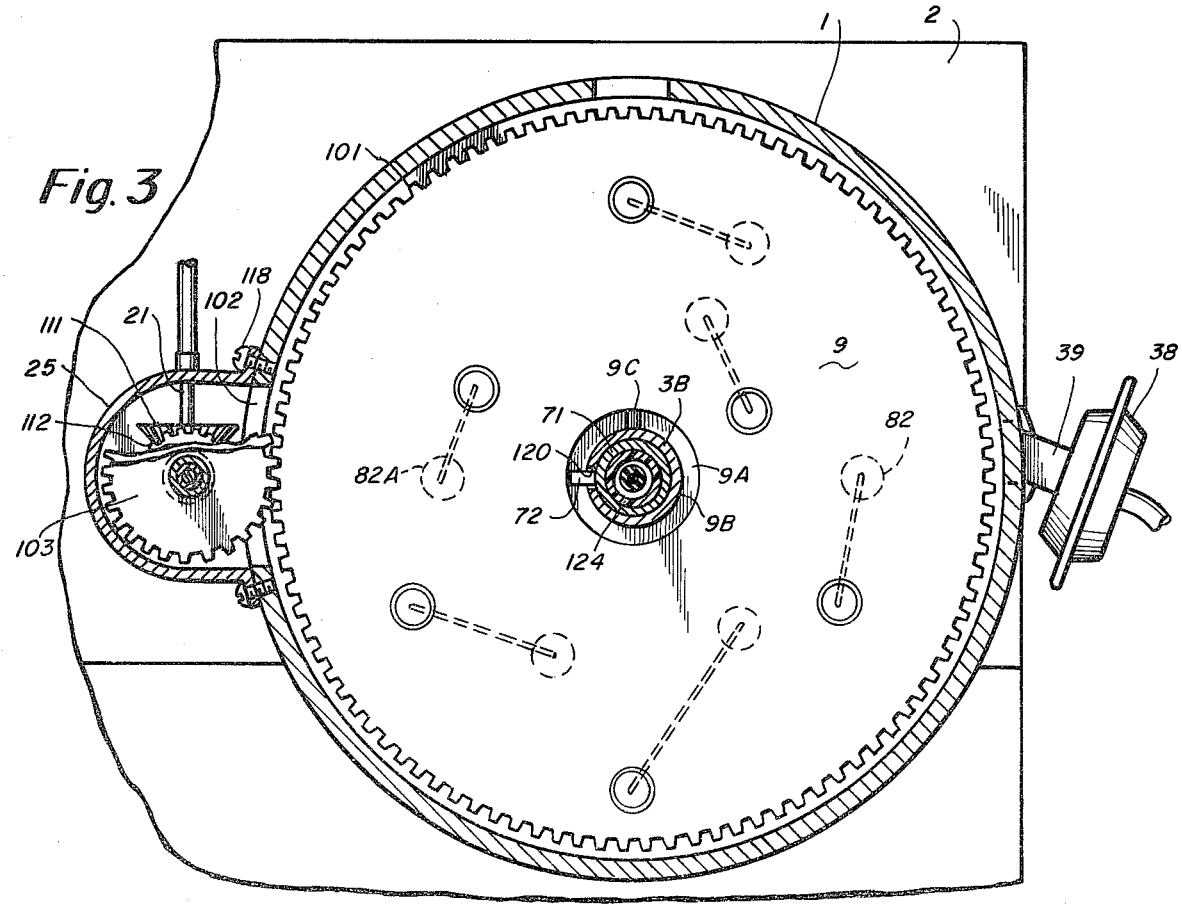
FIG. 3 is a cross-section of the invention taken through lines 3—3 of FIG. 2.

(FIG. 2) provides the mechanical linkage between the dial and flexible shaft system discussed in relation to FIG. 1 and the discs. Each of the discs has a set of gear teeth, such as 101 in disc 9 (FIG. 3), which is formed entirely around the outer circumference of the upper portion of the disc. Each set of gear teeth, such as 101, communicate through rectangular aperture 102 in casing 1 with a driving gear, such as 103 which is mounted exterior to the casing 1 (FIG. 2). Each of the discs is driven by a separate driving gear, with gear 103 driving disc 9, gear 104 driving disc 8, gear 105 driving disc 7, and gear 106 driving disc 6. The driving gears 103 through 106 are each independently mounted on one of a set of nested axles, 107, 108, 109 and 110 respectively. Each of the axles 107, 108 and 109 are hollow and each axle 108, 109, and 110 turns within the hollow of the next larger axle. Each axle is in turn driven by a pair of bevel gears at its end opposite the driving gears. For example, bevel driver gear 111 drives bevel gear 112 which is fixed to axle 107 and thus drives driving gear 103. Similarly bevel gear pair 113 and 114 drive driving gear 106 etc. The entire gear system is mounted between brackets 115 and 115A with the ends of axle 110 rotating in wells 116 and 116A in the brackets. Brackets 115 and 115A are secured to casing 1 by bolts 117. The entire gear system 100 is enclosed by gear housing 25 which is fixed to casing 1 by screws 118 (FIG. 3). Each of the pairs of bevel gears is driven by a separate one of the flexible shafts 21 through 24 discussed in relation to FIG. 1. For example bevel gear pair 111 and 112 is driven by shaft 21 (best seen in FIG. 3) which enters through the side of gear housing 25 and is fixed to the center of bevel gear 111. In this manner, as discussed earlier, each of the dials 10 through 13 (FIG. 1) which operate through shafts 21 through 24, controls the rotational position of one of discs 6 through 9.

Discs (plates) 6 through 9 also serve as a linking means by which cover 3 may be locked to casing 1. The structure of the locking mechanism is shown in FIGS. 2, 3, and 4. Each of discs 6 through 9 has a circular groove formed in its upper surface concentric with and communicating with a circular axial hole, for example, as best seen in FIGS. 2 and 3, disc 9 has circular groove 9A about circular hole 9B. Each disc also has a radial slot such as 9C, formed through the disc perpendicular to its surfaces and extending along a radius of the groove 9A.

As can best be seen in FIGS. 2 and 4, cover 3 comprises a heavy metal disc-shaped lid 3A and an integral hollow cylindrical post 3B extending perpendicular to lid 3A on one side of its center. A central cylindrical opening runs the length of post 3B and lid 3A. Post 3B also has a slot 120 formed along a radius extending from the distal end 121 along the major part of its length. Slot 120 has a width equal to the width of the slots, such as 9C, in discs 6 through 9. The exterior circumference of the distal end 121 of post 3B is threaded. The exterior diameter of cylindrical post 3B is just slightly less than the holes (such as 9B) in discs 6 through 9 so that the discs may be mounted on cover 3 by sliding post 3B through the holes (such as 9B) and then screwing retaining nut 122 on the threaded end 121 of post 3B. The lower surface of disc 9, then rides on the upper surface of nut 122, and each of the discs 8, 7, and 6 rides on the upper surface of the disc below it. Nut 122 is finger tightened so that the discs fit snugly against one another, compressing spring loaded contacts 90, 95, 97 etc., but they can still be easily rotated about cylindrical post 3B. Nut 122 also has a radial slot 122A of dimensions equal to the dimensions of the slots, such as 9C, in discs 6 through 9.

Turning our attention now to the lower portion of the locking mechanism, i.e. member 68 (FIG. 4), the exterior circumference of post 71 is just slightly less than the interior circumference of post 3B so that post 71 will just slide into post 3B. The series of radial studs 72 on post 71 are aligned directly above one another with the dimensions of studs just slightly less than the dimensions of radial slots 120, 122A and 9C so that if slot 122A is aligned with slot 120 and discs 6 through 9 are aligned so that all of their slots, such as 9C, also align with slots 122A and slots 120, then cover 3, together with the discs may be slipped over post 71 with the studs 72 passing through the slots until nut 122 rests within groove 76A in plug 76. Pin 86A fixed to the inner side of lid 3A fits into a hole in plug 86 to properly locate the two parts. The thickness of nut 122 is slightly less than the depth of groove 76A so that the lower surface of plate 9 rests on the upper surface of plug 76 compressing spring loaded contacts 80. The vertical and radial length of studs 72 and the position of the studs along post 71 is such that the studs just slide in the grooves, such as 9A, in the discs when the circular lip 3C around lid 3A is fitted snugly over circular lip 1A on casing 1. Then if the discs are rotated so that the slots, such as 9C, do not align with studs 72, the studs 72 will ride along the surface of the grooves (such as 9A) preventing each of the discs 6 through 9 from being raised away from member 68 and thus locking cover 3 in place.

Cover 3 may be removed from casing 1 by realigning studs 72 with the slots, such as 9C, in the discs 6 through 9, and then lifting the cover from the casing. Only one arrangement of the discs among the virtually limitless possible arrangements permits the cover to be removed and this arrangement corresponds to a unique combination of numbers being aligned with index 5 in window 4 (FIG. 1). This unique arrangement of the discs is preferably different from the arrangement which permits the engine to be started.

Returning to the discussion of FIGS. 2, 3, and 4 the high voltage lead 26 from the ignition coil passes directly down the center of post 71 to connect with the central high voltage terminal 78A of the distributor. An insulating sleeve 124 surrounds lead 26 within post 71 to prevent electrical arcing.

Figure 5:
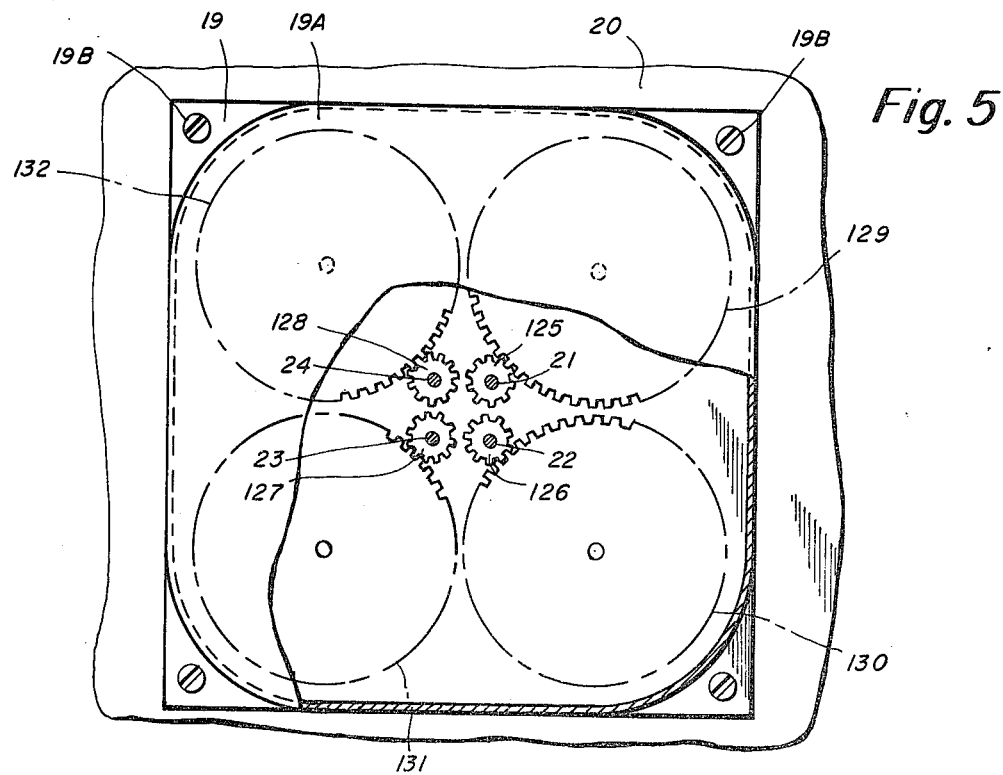
FIG. 5 is a cross-section of the invention taken through lines 5—5 of FIG. 1 showing the gear reduction mechanism mounted on the fire wall.

FIG. 5 shows the gear reduction mechanism mounted on the firewall 20 of the vehicle. Each of large gears 129, 130, 131, 132 are attached to the ends of one of flexible shafts 15, 16, 17 and 18, and drive one of small gears 125, 126, 127 and 128. The gear system is mounted on a plate 19 and covered by a gear cover 19A which are in turn mounted on firewall 20 by means of bolts 19B.

The gear ratios in the gear reduction mechanism and gear system 100 are such that as each of dials 10, 11, 12 and 13, (FIG. 1) is cycled through a complete revolution the corresponding disc within casing 1 also cycles through one revolution. Thus each number on each of the dials 10, 11, 12 and 13 will correspond to a unique rotational position of the corresponding disc, and the unique arrangement of the discs which permits the vehicle to be operated will correspond to a unique combination of numbers on the dials 10 through 13. Likewise the unique arrangement of discs which permit the cover to be removed from the casing will correspond to a unique combination of numbers on the dials. The combination which operates the vehicle and the combination that unlocks the casing are normally different.

The combination of numbers in window 4 which will permit the vehicle to be operated is determined by the placement of the contacts 90, 92, 95, 96 etc. on the surfaces of the discs. Each individual contact may be placed about anywhere on the disc surface, the only requirement being that the radial positions of the contacts on one surface correspond to the radial positions of the contacts on the abutting surface. It is not necessary that a given pair of contacts in a disc, such as 90 and 92, be on the same radius or the same radial distance from the center of the disc. Thus the number of possible combinations is virtually limitless.

For any particular unit of the invention, the particular opening and starting combinations as indicated in window 4 by the numbers on discs 6, 7, 8 and 9 will be determined in the manufacture of the unit. However the knobs of dials 10, 11, 12, and 13 are fastened to the ends of flexible shafts 15, 16, 17 and 18 by small set screws (not shown) so it is possible for the user to set the dial combination to a different set of combinations then those indicated in window 4, such as to include a combination he or she finds easy to remember.

Window 4 permits the mechanic to properly align the discs and to reset the dials 10, 11, 12 and 13 at their desired positions whenever the casing is opened for servicing etc. Window 4 also insures that if dials 11 through 13 become misaligned or some other defect occurs in the flexible drive shafts or the gear system which causes the discs to no longer be aligned in the proper position for opening or for starting the vehicle when the dials are set at the proper combinations, then one may set the combination by aligning the numbers on the discs with indicator 5 in window 4. Since these numbers are impressed upon the discs themselves, when the proper combinations are set in this manner they will always correspond to the proper position of the discs.

In addition to casing 1 and cover 3, plate 40 and all the various parts 46, 47, etc. for securing the casing to the engine block 2 are formed of especially hardened steel. Sheaths 21A, 15A, etc. are formed of steel or any other appropriate strong material. Flexible shafts 21 through 24 and 15 through 18, are formed of steel or any other strong metal. All gears are formed of hard plastic, such as nylon, or a suitable metal. Discs 6 through 9 are preferably formed of nylon but other suitable insulating materials may be used. However, if the discs are made of the softer plastic materials, the hubs of the discs should be made of a harder material to reduce wear from rotation of the discs about the post 3B. Preferably, where the discs are made of the softer plastic materials, the hubs are made of metal and are bonded to the plastic discs. The discs fit together tightly enough to eliminate any appreciable vertical "play" because the discs must not be prevented from turning by interference from studs 72 (FIG. 4) on the post 71. The discs should not, however, be so tightly packed as to make it difficult to move them by rotating the dials in the passenger compartment.

A feature of the invention is that it can not be easily defeated or by-passed. There is no way to defeat or by-pass the invention without physical destruction of the especially hardened steel casing. The casing 1 sits very close to or on the engine block 2 so that one of the parts securing the casing to the engine block can be reached from the outside of the casing. Any attempt to breach casing 1 by force such as prying, hammering, sawing, etc. would not only be very difficult but would also disrupt the distributor timing which would prevent the operation of the vehicle. The system may not be defeated by use of a substitute distributor except by also breaching the casing 1. However breaching the casing would very likely lead to damaging the distributor shaft 43 and/or the internal connection of the distributor drive shaft 56 with the internal drive members of the engine (not shown) which would also prevent the operation of the vehicle.

Excluding the physical breach of casing 1, which is extremely difficult, there is no way to by-pass or defeat the invention except by setting the proper combination. The heavy plastic window 4, the sheathing 15A and 21A etc. and the enclosed gear box prevent an unauthorized person from attempting to set the combination without having access to the passenger compartment of the vehicle. However even if one of these parts were breached, the unauthorized person must still set the combination. Attempting to set the combination by a trial and error method would take an impossibly long time because the number of possible combinations is in the hundreds of thousands compared to ordinary combination locks where the number of combinations is in the hundreds or at most the tens of thousands. Where it is suspected that someone has discovered the combination, the discs 6, 7, 8, 9 can be easily removed and replaced by a different set so that the old combination will be of no use.

A special distributor cap, somewhat altered from the original cap, would be supplied with the unit where the theft prevention device is installed as a "retrofit" upon a standard vehicle. The new distributor cap would be slightly shorter than than the "standard" cap to accommodate the flange 53 (FIG. 2).

Electrical connectors 31 through 36 are the standard spark plugs and coil wires. The only other alterations which must be made in the standard automobile is the simple drilling of holes in the firewall for flexible shafts 15 through 18 and bolts 19B, and possibly the drilling of holes in the dashboard for entry of the shafts. However many dashboards have knock out strips for mounting of accessories which may be used for mounting of dials 10 through 13. The invention may be used in combination with the conventional ignition key starting system or the ignition key may be replaced with a simple starting button.

The embodiment shown is for a six cylinder vehicle and thus there are six electrical connectors, six contacts on each surface of each of the discs, and six electrical connectors 77 etc. in plug 76. In a vehicle having eight cylinders the number of these parts would change to eight, and similarly in a vehicle having any other number of cylinders these parts would be equal to the number of cylinders. In this embodiment there are four discs and likewise four driving gears 106, 105, etc., four sets of bevel gears 111 and 112, etc., four dials 10 through 13 and likewise four each of all the parts controlling the discs. This number could be either more or less than four; if more it would make breaching the combination even more difficult but would add complexity, if less it would make breaching the combination easier but would lessen the complexity of the apparatus. However any number of discs, driving gears, dials, etc. greater than one is possible.

A novel theft-proof ignition system has been described that can be easily mounted on the conventional car, truck, tractor, and any vehicle whose engine is of the type having a distributor in its ignition system. It is evident to those skilled in the art that modifications of the embodiment described herein can be made without departing from the essentials of the invention. For example the casing 1 can be attached to the engine block by drilling and threading the engine block and fastening the casing directly to the engine block from the inside of the casing by means of bolts. As another example, the distributor body can be provided with an integral flange or a welded mount to which the casing can be attached without requiring the distributor to first be removed from the engine. Likewise the means for establishing the electrical paths and the means for locking the casing may have many variations. Discs 6 through 9 may be replaced by plates of any shape, and they may operate by translational motion rather than rotational motion. Cylindrical post 71 along the axis of the discs may be replaced by a larger cylinder which surrounds the circumference of the discs, in which case slots (9C) and grooves (9A) would be formed around the outer edge of the discs. Or the posts 71 and 3B may take on shapes and forms other than cylinders as long as they provide some physical connection to the discs or plates. The discs may be rotated or otherwise driven by many means besides gears, for example magnetic induction, driving motors, and many other means. A lever system may replace the dial method of moving the discs. The combination which operates the vehicle or unlocks the casing may be made adjustable by placing the numbers now stamped on the discs on rings which are adjustable about the circumference of the discs. In lieu of numbers, letters can be employed on the discs and on the dials inasmuch as the combination may then be set to form words that are easier to remember than a series of numbers. A hinged or sliding door may be provided on the dashboard to cover the knobs 10 through 13 to prevent the combination from being observed by persons riding in the passenger compartment.

Many other variations of the invention are possible. Consequently, the invention is to be construed as embracing each and every novel feature and novel combination of the features present in or possessed by the anti-theft device herein described.

What is claimed is:

1. In a vehicle of the type having a distributor mounted on the engine which controls the firing of the engine's cylinders by providing high voltage electrical impulses to the engines's spark plugs, the improvement of an anti-theft device comprising
   (1) a casing enclosing the distributor and its high voltage terminals, the casing comprising a hollow body and a lid adapted to be secured to the hollow body,
   (2) a first electrically insulative member fixed in the casing and having a plurality of electrical contacts on one face thereof, each of those electrical contacts being adapted to be connected to a different high voltage terminal of the distributor,
   (3) a second electrically insulative member fixed in the casing and having on one face thereof a plurality of electrical contacts each of which is connected to a different lead for transmitting high voltage electrical impulses to the engine's spark plugs,
   (4) a plurality of electrically insulative rotatable disc members interposed one upon the other between the first and second fixed members, each of the rotatable disc members having electrically conductive contacts disposed to mate with electrically conductive contacts on the subjacent and superjacent members whereby electrical paths are established from the aforesaid plurality of electrical contacts of the first fixed member to the aforesaid plurality of electrical contacts of the second fixed member only when all the movable members are set in a predetermined relation, and
   (5) locking means inside the casing for locking the casing about the distributor in a manner preventing the removal of the distributor from the engine, the locking means comprising
      (i) a post centrally situated in and fixed to the hollow body of the casing,
      (ii) a sleeve adapted to fit over the centrally situated post, the sleeve being attached to and depending from the lid of the casing, each of the rotatable disc members being mounted to rotate about the sleeve, and
      (iii) the rotatable disc members and the centrally situated post having cooperating means permitting the lid to be detached from the hollow body only when the rotatable disc members are set in a predetermined relation.

* * * * *